United States Patent [19]
Pelletier

[11] Patent Number: 5,885,203
[45] Date of Patent: Mar. 23, 1999

[54] METHOD OF DECONTAMINATING SOILS AND/OR RESIDUES IN SITU AND EX SITU COMBINING HORIZONTAL RADIAL FLOW TECHNIQUE AND DEPOLLUTING AGENTS

[75] Inventor: Marc-Antoine Pelletier, Ile-des-Soeurs, Canada

[73] Assignee: Les Expertises Environmentales Soconag Inc., Montreal, Canada

[21] Appl. No.: 765,480

[22] PCT Filed: Jun. 28, 1995

[86] PCT No.: PCT/CA95/00397

§ 371 Date: Dec. 24, 1996

§ 102(e) Date: Dec. 24, 1996

[87] PCT Pub. No.: WO96/00624

PCT Pub. Date: Jan. 11, 1996

[30] Foreign Application Priority Data

Jun. 28, 1994 [GB] United Kingdom ............... 9412997

[51] Int. Cl.$^6$ .............. A62D 3/00; B09B 3/00; B09C 1/08; B09C 1/10
[52] U.S. Cl. ............ 588/249; 210/170; 210/747; 405/128; 588/205; 588/900
[58] Field of Search .................. 588/205, 249, 588/900; 405/128, 129; 210/170, 747, 901; 435/262.5

[56] References Cited

U.S. PATENT DOCUMENTS

| | | | | |
|---|---|---|---|---|
| 4,810,385 | 3/1989 | Hater et al. | ............ | 210/606 |
| 4,832,122 | 5/1989 | Corey et al. | ............ | 166/266 |

(List continued on next page.)

FOREIGN PATENT DOCUMENTS

| | | |
|---|---|---|
| 2094092 | 10/1993 | Canada . |
| 2111279 | 6/1994 | Canada . |
| 0255354 | 3/1988 | European Pat. Off. . |
| 41 00 758 | 7/1992 | Germany . |
| WO 93/11307 | 6/1993 | WIPO . |
| WO 93/23134 | 11/1993 | WIPO . |
| WO 94/04761 | 3/1994 | WIPO . |
| WO 94/05604 | 3/1994 | WIPO . |
| WO 94/23857 | 10/1994 | WIPO . |
| WO 94/25191 | 11/1994 | WIPO . |
| WO 95/00208 | 1/1995 | WIPO . |
| WO 95/01232 | 1/1995 | WIPO . |

OTHER PUBLICATIONS

"In Situ and Ex Situ Bioremediation of Soils Contaiminated by Petroleum Distillates" Hater et al. 1989, pp. 1–7.

(List continued on next page.)

*Primary Examiner*—George A. Suchfield
*Attorney, Agent, or Firm*—Merchant, Gould, Smith, Edell, Welter & Schmidt

[57] ABSTRACT

A process for in situ remediation of contaminated soils and/or residues is disclosed. This process takes advantage of a horizontal radial flow irrigating/draining system and sensors (8) located at midspacing between parallel conduit lines (5) to create an environment propitious to the action of decontaminating agents (plants, microorganisms, salts, acids, bases, buffers, enzymes, substrates, surfactants, etc.). For example, a water-saturated zone may be created, the level of water containing decontaminating agents is raised, maintained and/or lowered, which water-saturated encourage desorption or solubilization of soluble contaminants, by adjusting and controlling all the parameters of reaction (time, temperature, pH, oxygenation, etc.) The process is easily adaptably for many classes of contaminants, including volatile compounds and light non-aqueous phase liquids, by further installing supplementary sets of conduit lines and pumping means at adequate levels. The site may be remedied by alternating gaseous and liquid modes to optimize the conditions of reaction, which alternation is advantageously achieved in a multi-unit arrangement, one unit being in gaseous mode while another is in liquid mode.

29 Claims, 6 Drawing Sheets

U.S. PATENT DOCUMENTS

| | | | |
|---|---|---|---|
| 4,849,360 | 7/1989 | Norris et al. | 405/128 X |
| 4,850,745 | 7/1989 | Hater et al. | 405/258 |
| 4,890,955 | 1/1990 | Mercier | 405/37 |
| 4,948,294 | 8/1990 | Mercier | 405/37 |
| 4,992,174 | 2/1991 | Caplan et al. | 210/610 |
| 5,002,428 | 3/1991 | Shettel | 405/39 |
| 5,020,567 | 6/1991 | Proulx | 137/315 |
| 5,120,160 | 6/1992 | Schwengel | 405/128 |
| 5,133,625 | 7/1992 | Albergo et al. | 405/128 X |
| 5,155,042 | 10/1992 | Lupton et al. | 435/262.5 |
| 5,160,214 | 11/1992 | Sakurai et al. | 405/36 |
| 5,160,216 | 11/1992 | Takada et al. | 405/92 |
| 5,160,217 | 11/1992 | Metzer et al. | 405/128 |
| 5,186,255 | 2/1993 | Corey | 166/250 |
| 5,190,405 | 3/1993 | Vinegar et al. | 405/128 |
| 5,193,934 | 3/1993 | Johnson et al. | 405/128 |
| 5,221,159 | 6/1993 | Billings et al. | 405/128 |
| 5,228,804 | 7/1993 | Balch | 405/128 |
| 5,233,164 | 8/1993 | Dicks et al. | 219/528 |
| 5,244,310 | 9/1993 | Johnson | 405/128 |
| 5,252,226 | 10/1993 | Justice | 210/747 X |
| 5,264,368 | 11/1993 | Clarke et al. | 436/3 |
| 5,271,693 | 12/1993 | Johnson et al. | 405/128 |
| 5,302,286 | 4/1994 | Semprini et al. | 210/610 |
| 5,316,751 | 5/1994 | Kingsley et al. | 423/571 |
| 5,318,045 | 6/1994 | Rawls, Jr. et al. | 128/898 |
| 5,345,034 | 9/1994 | Corey | 588/249 |
| 5,389,267 | 2/1995 | Gorleick et al. | 210/758 |
| 5,395,950 | 3/1995 | Tuong | 549/302 |
| 5,398,756 | 3/1995 | Brodsky et al. | 166/248 |
| 5,403,119 | 4/1995 | Hoyle | 405/128 |
| 5,435,176 | 7/1995 | Manchak, III | 405/128 X |
| 5,679,256 | 10/1997 | Rose | 210/747 X |

OTHER PUBLICATIONS

"Development of an On–Farm Biological Pollution Control System" Ugwegbu et al., Northeast Agr/Bio–Engineering Conference 1994, pp. 1–8.

"The Bacta–Pur™ Letter" Feb. 1992, vol. 1, No. 1. pp. 1–8.

"Preconditioning" 1993. p. 1.

"Biodegradation of Hydrocarbons in Soil with the Bacta–Pur™ System" D.F. Ehrlich pp. 1–4.

"The Bacta–Pur™ System" pp. 1–2.

"Biodegradation of Phenols & Hydrocarbons" p. 1.

METHOD OF DECONTAMINATING SOILS AND/OR RESIDUES IN SITU AND EX SITU COMBINING HORIZONTAL RADIAL FLOW TECHNIQUE AND DEPOLLUTING AGENTS

FIELD OF THE INVENTION

The present invention relates to a method of decontamination of soils and residues like petroleum product wastes, mine tailings, radioactive residues, metals and contaminated muds.

BACKGROUND OF THE INVENTION

Contaminated soils and residues, and ground waters draining these soils or residues pose an environmental problem to our industrial societies. Excavating, ploughing and covering contaminated soils or residues as well as pumping contaminated waters for further treatment in treating plants have been used in the past to solve this problem. These procedures however take time and effort and are usually practised at high costs.

Methods of in situ decontamination have been proposed, which methods address to this problem with more practical and less expensive solutions.

A great deal of work has been devoted for remediation of soils containing volatile contaminants. These technologies make use of means for injecting air in soils, which air may be heated if necessary. Contaminants having affinity for gaseous fluids are carried thereby and are collected by vacuum at the same level by immediate suction or at a higher level if air is injected in a water saturated zone. The water is in this case used as a medium allowing for proper ascending movement of the air-conveyed contaminants. When the environment wherein air is injected is not water saturated, a hydraulic gradient may also be created to govern the direction of air-conveyed contaminants. These technologies are described in U.S. Pat. Nos. 4,832,122, 5,193,934, 5,221,159, 5,244,310, 5,271,693, 5,389,267, 5,395,950, 5,403,119 and 7,935,950.

U.S. Pat. No. 5,398,756 and international patent publication WO 95/01232 make use of an electric current applied to direct the movement of ionic contaminants towards a treating zone. The environment may be saturated with water or a water gradient may be applied to attend the proper direction of the contaminants.

Other methods of in situ remediation are disclosed in international patent publications WO 95/00208, 94/25191, 94/23857, U.S. Pat. Nos. 4,850,745, 5,302,286 and 5,316,751. These methods are directed to water soluble or suspendible contaminants. These methods make use of water injection to completely immerse the contaminated site or residues or of water injection pumped over the contaminated site or water drawn from a saturated upper level (vadose) that further percolates through the site to a collecting system installed to a lower level. Decontaminating agents like bacteria may be added in the injected water or may be located in proximity of the collecting system which becomes a treating zone. When indigenous bacteria are put to contribution for remediation, the decontaminating agents may be nutrients and/or oxygen to support the growth and activity of the microorganisms.

All these references describe methods that are directed to a specific category of contaminants, volatile or water soluble. When water soluble contaminants are targeted, these methods do not encourage a long residence time of water in the soils to provide a saturated water site propitious for an extensive action of the decontaminating agents, unless the site is completely immersed or contaminated water is pumped over a site of low porosity (which porosity however may not be homogenous) and collected towards a treating zone or reactor. Contaminated water pumping has the disadvantage that contaminants may not be transported efficiently to the treating zone, and a substantial part thereof remains in the site, or multiple injecting, percolating, collecting and recirculating steps are necessary to efficiently carry contaminants to the treating zone. If plants are to be grown on the site for esthetic purpose or put to contribution as decontaminating agents (because they can hyperaccumulate metals and radioactive substances), a suitable level of water cannot be carefully controlled and maintained to encourage their optimal growth and activity. Users are left with only one choice: growing aquatic plants that may grow in a completely immersed site, if feasible. When a non-immersion technique is used, injection and percolation of water may carry contaminants away from the decontaminating plants while not providing optimal conditions of growth and activity.

There is clearly a need for a more performing and more versatile method of remediation that could be achieved if the level of the water table in the site is carefully controlled.

STATEMENT OF THE INVENTION

This an object of the present invention to provide a new process for in situ remediation of a site containing contaminated soils or residues, which comprises:

a) assessing the site for the type of contaminants and for the conditions of reaction to be used to remove said contaminants;

b) determining a unit of surface of the site to be remedied;

c) installing at least one circuit of a horizontal irrigating/draining system in the unit of the site under said contaminated soils or residues, said circuit of horizontal irrigating/draining system comprising fluid pumping means, a horizontal main conduit line connected to said fluid pumping means and a plurality of perforated horizontal secondary conduit lines that are perpendicular to said main conduit line and connected thereto, said pumping means being alternatively connected to a first reservoir containing fresh fluids, a second reservoir for storing drained fluids, a third reservoir for separating drained fluids or a fourth reservoir for amending drained fluids;

d) installing one or more sensing means for measuring the level of the fluids in the site or for evaluating the composition or pressure (negative or positive) of said fluids, said sensing means being disposed at midspacing between two adjacent secondary conduit lines;

e) injecting fluids through said fluid pumping means and conduit lines until sensing means indicate an adequate level, composition or pressure of said fluids in the site;

f) maintaining said fluids into the site until said sensing means indicate that the composition of said fluids requires replacement or amendment of said fluids, in accordance with the assessed conditions of reaction;

g) withdrawing said fluids from the site through said conduit lines and pumping means towards said second, third or fourth reservoirs;

h) when drained fluids need separation or amendment, separating or amending said drained fluids in said third or fourth reservoirs;

i) injecting fluids pumped from said first reservoir, fluids recovered after separation in said third reservoir or fluids amended in said fourth reservoir into the site through said unit; and j) repeating steps e) to i) until the site is remedied.

Specific embodiments of this invention make use of one or more circuits of pumping means and conduit lines. One circuit may be installed for injecting and withdrawing fluids. Two circuits may be installed at the same vertical level, one for injecting and the other for withdrawing fluids. Two circuits may also be installed at different vertical levels, a lower one for injecting and withdrawing fluids and an upper one for withdrawing fluids that have a low density. Three circuits may be installed, a first circuit for injecting fluids and a second circuit for withdrawing the same, said first and second circuits being installed at substantially the same vertical level and a third circuit installed at a higher vertical level for withdrawing fluids of a low density. Four circuits may be installed in the site, a first circuit for injecting fluids and a second circuit for withdrawing the same, said first and second circuits being installed at substantially the same vertical level, a third circuit installed at a higher vertical level for withdrawing fluids of a low density and a fourth circuit installed slightly above said second circuit for withdrawing fluids floating over the fluids withdrawn through said second circuit. The fluids may be liquid or gaseous. Liquid fluids may be injected and withdrawn alternately with gaseous fluids. Liquids may also be alternately with liquids and gas alternately with gas. Liquid fluids that are injected contain decontaminating agents selected from bacteria, acids, bases, salts, buffers, chelator agents, vitamins, substrates, enzymes, surfactants, and combinations thereof, in accordance with the assessed conditions of reaction. The sensing means are selected from the group consisting of aerodynamic, hydrodynamic, piezometric, $CO_2$ metric, $O_2$ metric, pH metric, nutrient metric, photometric, radiometric, thermometric means and combinations thereof. Plants may be further grown on the site, said plants are put to contribution to remedy the site in accordance with the assessed conditions of reaction, for their capacity to hyperaccumulate metals and radioactive substances. Additional means selected from the group consisting of heating, vibrating, electric, magnetic means, and combinations thereof, may be further included in accordance with the assessed conditions of reaction to attend and accelerate the reaction.

In another embodiment of the invention, a multi-unit arrangement is provided to optimize the conditions of reaction. A first unit may be placed in gaseous mode while the other is in liquid mode at the same time. The first unit may be in gaseous mode and in liquid mode in alternate sequence while the other unit is in the inverse sequence. Therefore, when the first unit terminates the gaseous mode, it becomes ready to be placed in liquid mode, the liquids coming from the other unit that has just terminated the liquid mode. Alternation liquids/liquids and gas/gas is also contemplated.

DESCRIPTION OF THE INVENTION

In accordance with the present invention, a new process for in situ and, if necessary, ex situ remediation of contaminated soils and residues is provided. The present process advantageously makes use of a horizontal radial flow irrigating/draining system like the one described in the U.S. Pat. Nos. 4,890,955, 4,948,294 and 5,020,567. Generally, the method consists of circulating water in a network of horizontal ground pipes, and controlling the level of the water table by monitoring a horizontal radial flow. Horizontal radial flow is different, more versatile and requires much less pressure and control than the vertical radial flow (wells), to disperse the water more uniformly into the soil, when the irrigation mode is actuated. When, on the contrary, drainage mode is actuated to extract an excess of water, the level of water is efficiently and more uniformly decreased. A control chamber is provided at the exit of a main collector pipe to control the addition or extraction of water, depending on particular needs. Most importantly, sensing means adequately disposed between irrigating-draining pipes and at a certain vertical level in the site, where the water table should be maintained, provide for an accurate reading and control of the water level. The sensing means may be connected to the control chamber which governs automatic addition or withdrawal of water. Liquid or gaseous fluid sensing means may be disposed in a site and perform their monitoring and controlling task based on this principle. Other sensing means have been disclosed in the international patent publication WO 94/23857. However these sensing means are disposed within the irrigating/draining pipes to control the output of water only and not to sense the real water table level, in contrast with the sensor preferably used to operate the present invention.

The radial horizontal flow technique associated with sensing means is used in the present invention to supply and withdraw fluids (liquid or gaseous), together or in sequence, to create an optimal environment wherein decontaminating agents are present or added and are maintained for a determined period of time. With the precious aid of sensing means, parameters of reaction (for example, residence time, air and/or water saturation, pH, nutrient contents, concentration of decontaminating agents, substrate degradation, temperature, oxygen consumption and content, $CO_2$ and metabolite production and decontamination) can be optimally controlled. Therefore, a battery of sensors may be disposed in the site. The only provision is that these sensors are installed at a midspacing location between two adjacent horizontal pipes to take into account the radial horizontal flow pattern of the fluids. As soon as a sensor indicates a limitative value for a given parameter, fluids are withdrawn, amended and returned to the system, alternately or not with other fluids, in such way that the system always performs at best. Withdrawal of fluids may be automatic or performed by an operator.

The choice of the decontaminating agents (surfactants, chelators, enzymes, substrates, salts, buffers, bases, acids, vitamins, microorganisms, plants, etc.) is guided by the type of contaminant to remove. The decontaminating agent may be indigenous or exogenous. Indigenous bacteria may be allowed to work in optimal conditions in a controlled environment created by the present process. Exogenous bacteria may also be added to the irrigating water along with nutrients, buffers and other chemicals. Examples of bacterial agents which could be added to decontaminate soils are those sold under the trademarks BACTA-PUR (sold by Aquaresearch Ltd. P.O. Box 689, Derby Line, Vt. 05830, U.S.A.) and AUGMENTED BIORECLAMATION (ABR) (sold by Sybron Chemicals Inc., Birmingham, N.J., U.S.A. or those sold under various trademarks by Kiseki, $44^{th}$ Avenue S.-E., Calgary, Alberta, Canada, T2O 4X4). The environment of indigenous or exogenous bacterial agents is optimally controlled by monitoring and amending the medium of reaction that is created by the present process.

The present invention is in no way limited to the technology disclosed in U.S. Pat. Nos. 4,890,955, 4,948,294 and 5,020,567. Alternative systems may be developed to fulfil essential requirements of the present invention, that is raising, maintaining and lowering the level of fluids in the site with a precise monitoring and control of the real level, pressure or concentration at a given time. These criteria are fulfilled with horizontal radial flow technique combined with adequately disposed sensing means. It will be readily understood that such a precise level control is possible in a confined site to reduce leak or loss of fluids that may impede the control of fluid level. To minimize loss of fluids, it is preferable that the soil is contained in a substantially impervious basin. The impervious basin may be natural, created by precipitating integral compounds of the site that will create an impervious mass or layer, created by installing a membrane (synthetic or natural) that lines sides of the site, or a combination of both (the bottom side of the basin may be natural and the lateral sides are imperviated by a membrane, for example). The confined site may also be a tank wherein a relatively small volume of residues or soils have been discharged.

Complementary systems can be added at will to cope with the nature of the site and of the contaminants. For example, in lieu of a single set of horizontal conduit pipes that sequentially inject and withdraw fluids, a double set of pipes may be installed at substantially the same vertical level, one for injecting fluids and the other for withdrawing the same. When light non-aqueous phase liquids (LNAPLs) are to be recovered, an additional set of pipes over and at a level slightly higher than the pipes that withdraw aqueous fluids. Alternatively, volatile compounds having affinity for gaseous fluids can be transported out of the site by sequentially injecting and withdrawing gaseous fluids by one single set of pipes installed at the bottom of a site, while taking care of eventual leak of volatile contaminants by the top of the site (air pressure adjusted not to be too high or by imperviating the top of the site). If necessary, the site may be saturated with liquids by injecting water, for example, and gas like air is further injected by the same or another circuit of pipes. Volatile contaminants may therefore be collected through a second set of pipes installed at a higher level. The water then becomes a medium that facilitates the ascending movement of gaseous fluids. Losses may be prevented by creating an inward gradient towards the contaminated site. Other means like heating, electrical, magnetic or vibrating means can be further added to attend and to accelerate the decontamination process. Complementation of the system by mixing devices and dosage pumps is also conceptual.

Contaminated air is generally rid of contaminants through passage and separation on activated carbon filters or on equivalent devices like a BCI™ device (Sybron Chemicals) and returned to the system or in the environment.

After remediation of the contaminated soils or residues has been achieved, the fluid effluents may be disposed of or recirculated through the system. If free of health hazardous substances, fluids can be discharged in the environment. It can be separated or not from solids (bacteria, for example). If the effluents are charged with pollutants as a result of a transfer, solubilization or desorption from the soil to the water, pollutants may be separated in reactors installed on the site or in a treating plant, before returning to the environment or to the system. This applies particularly for metals that may be recovered from mine tailings effluents, for example. Therefore, the fluid pumping means can pump fluids from a variety of reservoirs: a fresh fluid reservoir, a reservoir wherein fluids are amended before returning to the system or a reservoir wherein fluids are separated from contaminants before returning to the system.

Plants can also be put to contribution to hyperaccumulate metals and radioactive substances. Plant needs are therefore particularly fulfilled by the present process that can achieve optimal nutrient concentration and soil liquid and gas level, if one considers that the basic technology was developed for agricultural purpose.

The present invention is versatile and is suitable for remedying soils or residues containing a multitude of contaminants. The limit of the present process is imposed by the availability and/or identification of the decontaminating agent for a particular contaminant and, when living organisms are put to contribution, by the toxicity of the soils towards live forms. As the site itself may become a reactor, one will readily appreciate that the need for erecting reactors on the site or at distance therefrom is diminished or abolished because the confined soils or residues themselves are integral parts of the created reactor.

The main advantages of the present invention reside in that:

no handling and no transportation of soil or of polluted liquids is necessary in the case of a self-sufficient in situ process;

the need for an external reservoir or reactor to receive polluted waters is minimized, the confined soil itself playing the role of this reservoir;

as a substantial reduction of pollutants occurs, the present process renders the depollution easily targeted to one or more restricted class(es) of pollutants that are concentrated in a site, instead of being lixiviated and percolated by surface water through ground water, lakes and rivers wherein they are diluted;

the process can be made sequential, to address different classes of pollutants and different purposes which require different conditions of reaction; for example, when recuperation of metals is envisaged, acidification of the soil should be promoted to allow the indigenous bacteria or exogenously added bacteria to solubilize these metals, after which step, the pH of the soil can be made near neutral with an agent like $Ca(OH)_2$, in order to entail of further steps of precipitation or to support bacterial or plant growth and activity;

the process also allows to drain the effluent to an external biological reactor or reservoir, if further treatment is necessary for a particular class of contaminants;

soils and residues can be covered with arable soil and to allow the growth of plants; and when dispersing agents or surfactants are necessary, the water saturation and the duration of contact between them and the polluting material adsorbed on soil particles favours its desorption, this desorbed material can be drained to the outlet or absorbed by the plants growing at the surface of this site or by the leaching bacteria.

The present invention will be more readily understood by the use of the appended Figures and Examples which purpose is to illustrate the invention rather than to limit its scope.

BRIEF DESCRIPTION OF THE DRAWINGS

FIG. 1 is a cross-sectional view of a mine tailings site confined by a natural impervious layer and by a lateral membrane. The level of water is illustrated by the sign. The liquid/gas level, pressure and/or concentration sensors are represented by a sensing station like piezometric posts. The liquids injected may contain acids or neutralizing compounds, substrates, nutrients and bacteria, depending on the type of contaminants and on the sequence of actions taken to rid of as many contaminants as possible, and restore the site in accordance with the present invention.

FIG. 2a) is a top view of a four unit decontaminating arrangement and FIG. 2b) is an enlarged top view of a subset of two units shown in FIG. 2a). An instrumentation station comprising liquid and gas pumping stations communicating with an adjustment reservoir for aerating and amending liquids before they are returned to the system or to the environment (exit not shown) is disposed between two units. FIG. 2c) is a cross-sectional view taken between lines A—A of FIG. 2a). In this figure, each unit is confined in its lateral and bottom sides by a membrane to imperviate and to confine the site. The horizontal draining/irrigating secondary pipes are shown at the bottom of the site as well as the control chamber and the sensors of each unit.

FIG. 4b) is a cross-sectional view taken between lines A—A of FIG. 4a). One can see that aerodynamic sensing means are electrical but are not limited to electrical means. A plurality of sensors (piezometric, $CO_2$ metric, $O_2$ metric, nutrient metric, radiometric, thermometric, photometric, etc.) are also shown, each sensor disposed at different vertical levels. FIG. 4c) is a cross-sectional view taken between lines B—B of FIG. 4a). The metric sensors of FIG. 4b) are disposed at midspacing of two adjacent lateral pipes. Hydrodynamic and aerodynamic sensors are disposed under and above the main conduit pipe to measure movement of liquid and gas movement, respectively. In this particular case, the site is completely immersed and does require fine adjustment of the liquid level but only monitoring liquid movement.

FIG. 5c) is a cross-sectional view taken between lines B—B of FIG. 5a). Legend as in FIG. 4a), b) and c) except that hydrodynamic sensing means are inactivated (in white) and aerodynamic sensing means are activated (in black). Gaseous fluids are injected until the metric sensors indicate a suitable level and/or concentration of gas in the site.

EXAMPLE 1

Mine Tailings

Figure 1:
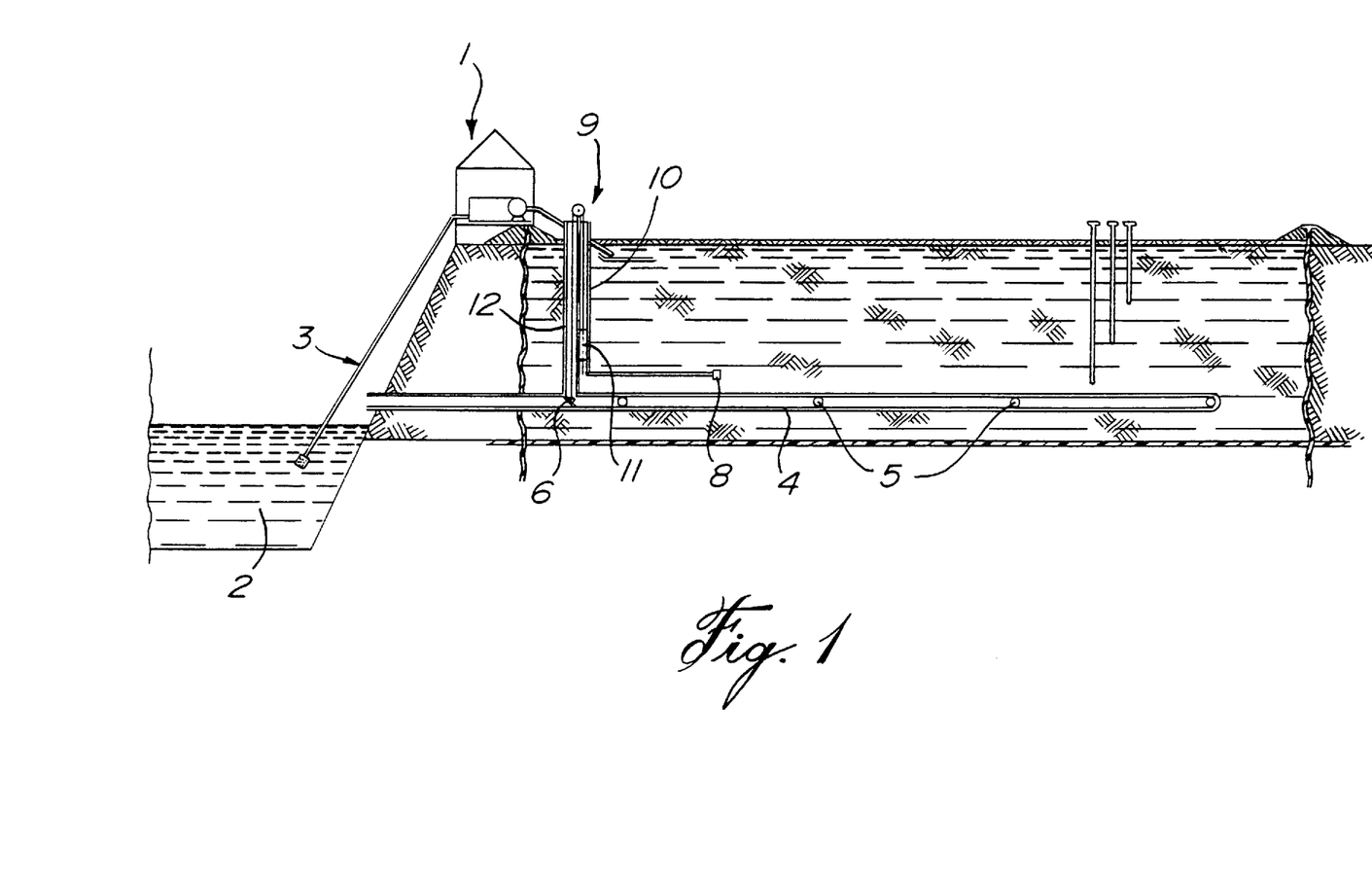
Figure 2A:
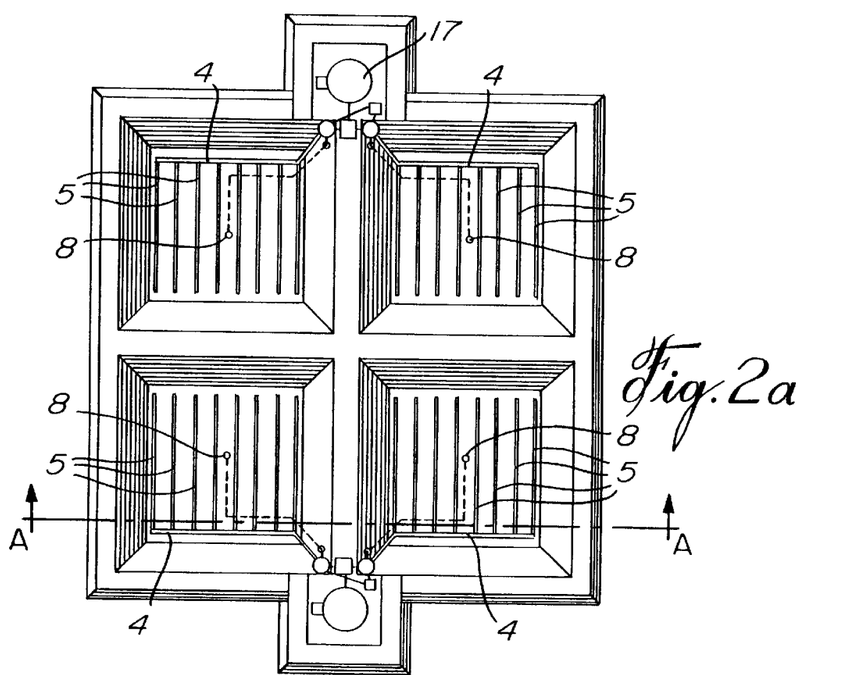
Figure 2B:
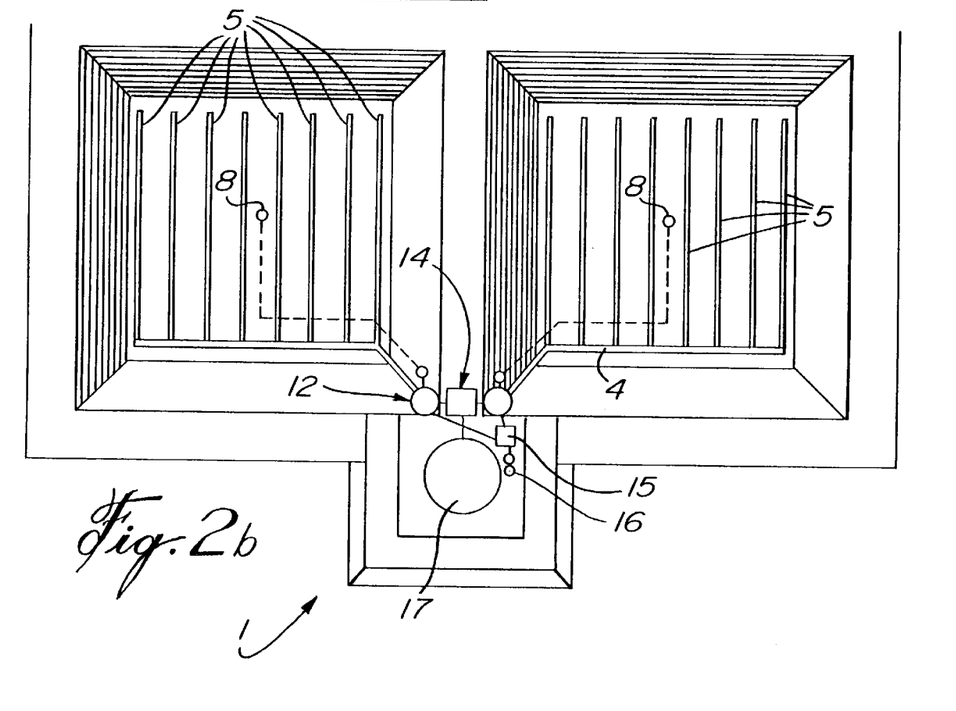
Figure 2C:
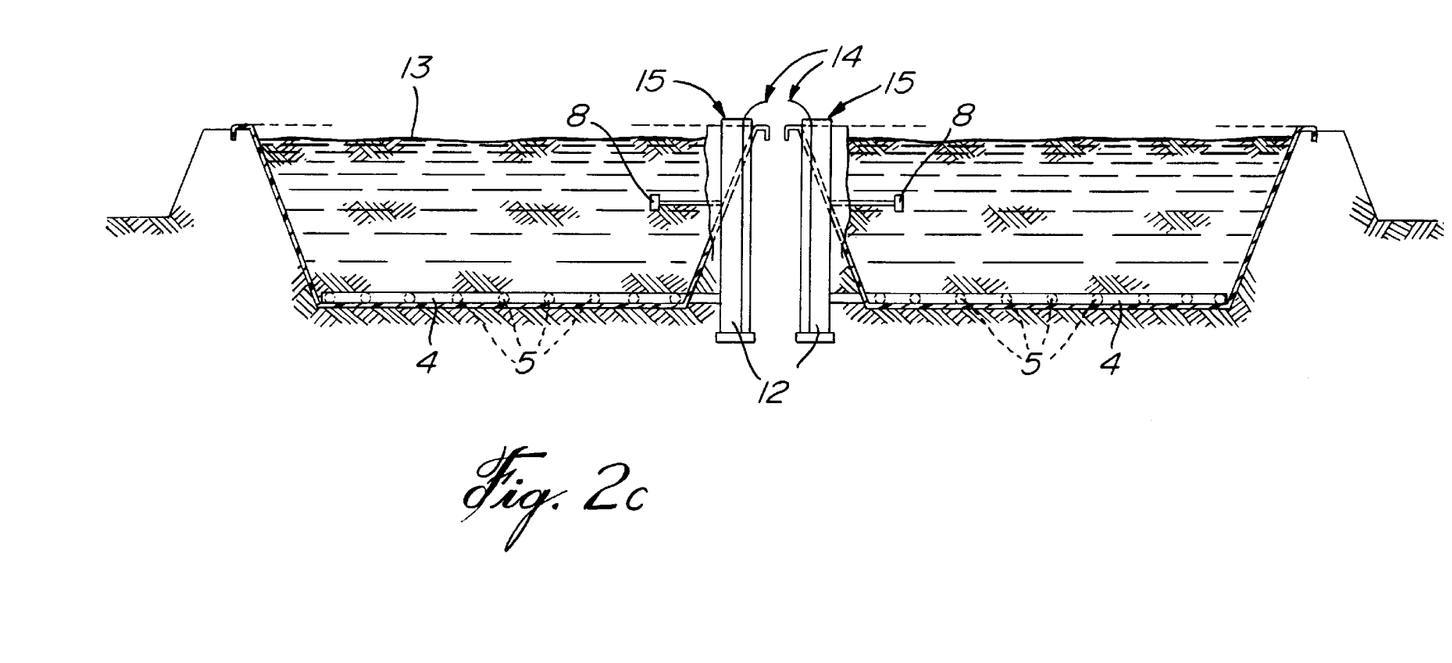

A particular example of contaminated soil which could be restored by the present invention is mine tailings. Referring to FIG. 1, the site sits on a natural impervious layer. The site has been therefore confined by adding a geomembrane at its lateral sides. An instrumentation station 1 comprising installations for amending and adjusting the water contents is located at the proximity of the system of irrigating/draining pipes. Fluids are first pumped from a fresh water well or reservoir 2 and transported by a pumping line 3 to the instrumentation station wherein acids or bases are added. The irrigating/draining system consists of a main conduit line 4 and a series of secondary conduit lines 5 that are connected perpendicularly to the main conduit line 4. When fluids are injected, a door 6 is in close position. When the same are withdrawn, The door 6 is opened. Opening and closing of the door 6 is effected by a control chamber 9 which itself communicates with the main conduit line 4 and the secondary conduit lines 5. The control chamber consists of two hollow chambers 9 and 10. The chamber 10 is a head stand control receiving water at the level of fluid sensor 8. The sensor 8 therefore is located where the level of fluid will be maintained for optimal conditions of reaction. The sensor 8 is located at midspacing between two secondary conduit lines 5. The head stand control 10 contains a floating device 11 which movement, governed by the level of fluids perceived by the sensor 8, actuates the opening or closing of the door 6 by way of pulley and rope disposed at the top and between the hollow chambers 10 and 12. In this particular example, injection and withdrawal of fluids may be automatic and depends solely on fluid level or performed by an operator after a determined time or when a limitative parameter of reaction is read by other sensing means (pH, for example; not shown).

Fluids are withdrawn and pumped towards the environment (if tested free of contaminants) or into the adjustment basin, wherein its is tested and amended upon needs to be returned into the site or returned to a storing reservoir or a secondary bog if further treatment is necessary, like separation and recovering of collected metals. A layer of arable soil may be added to cover the site, and plants can be grown on this site. Plants may be used to hyperaccumulate metals and radioactive substances. The level of water may be adjusted to an optimal level to support plant life and growth. Piezometric means as other sensing means may also be disposed in replacement or in addition to the sensors described in U.S. Pat. No. 4,890,955 at different vertical levels but always at midspacing between two secondary conduit lines to monitor the level and content of fluids during decontamination wherein fluids are injected and withdrawn periodically.

FIGS. 2 to 5 show a multi-unit arrangement, particularly adapted to grow leaching bacteria and to remove volatile pollutants. Referring to FIGS. 2a), b) and c), one instrumentation station 1 is provided for two units, this station comprising an adjustment basin 17 for aerating and adjusting/amending the aqueous components before liquids are returned to the system. Each unit has its own control chamber consisting of a head stand control 10 and associated hollow chamber 12. The liquid pumping means 14 is located between two adjacent control chambers. When liquids are withdrawn from a unit, they are pumped towards the adjacent unit or the adjustment basin 17. When in gaseous mode, gas are pumped through gas pumping means 15 and through the same circuit of irrigating/draining pipes 4 and 5. When gas are withdrawn, the collected gas carrying volatile pollutants are decontaminated by separation on carbon filters 16 (or a BCI™ device may be used). Decontaminated gas or air is then returned to the environment or used to aerate the basin 17.

The advantage of a multi-unit arrangement is that it provides for a sequential decontaminating gas/liquid modes to be actuated alternately. This way, the liquid volume is not returned to the environment when not satisfyingly free of contaminants but in another adjacent unit ready to be in liquid mode. The alternated liquid/gas modes finely permit accommodation of living leaching organisms. Plants and bacteria need an environment supporting their life and activity, which environment is conveniently monitored and controlled by varying oxygenation, nutrients, temperature and pH.

Figure 3:
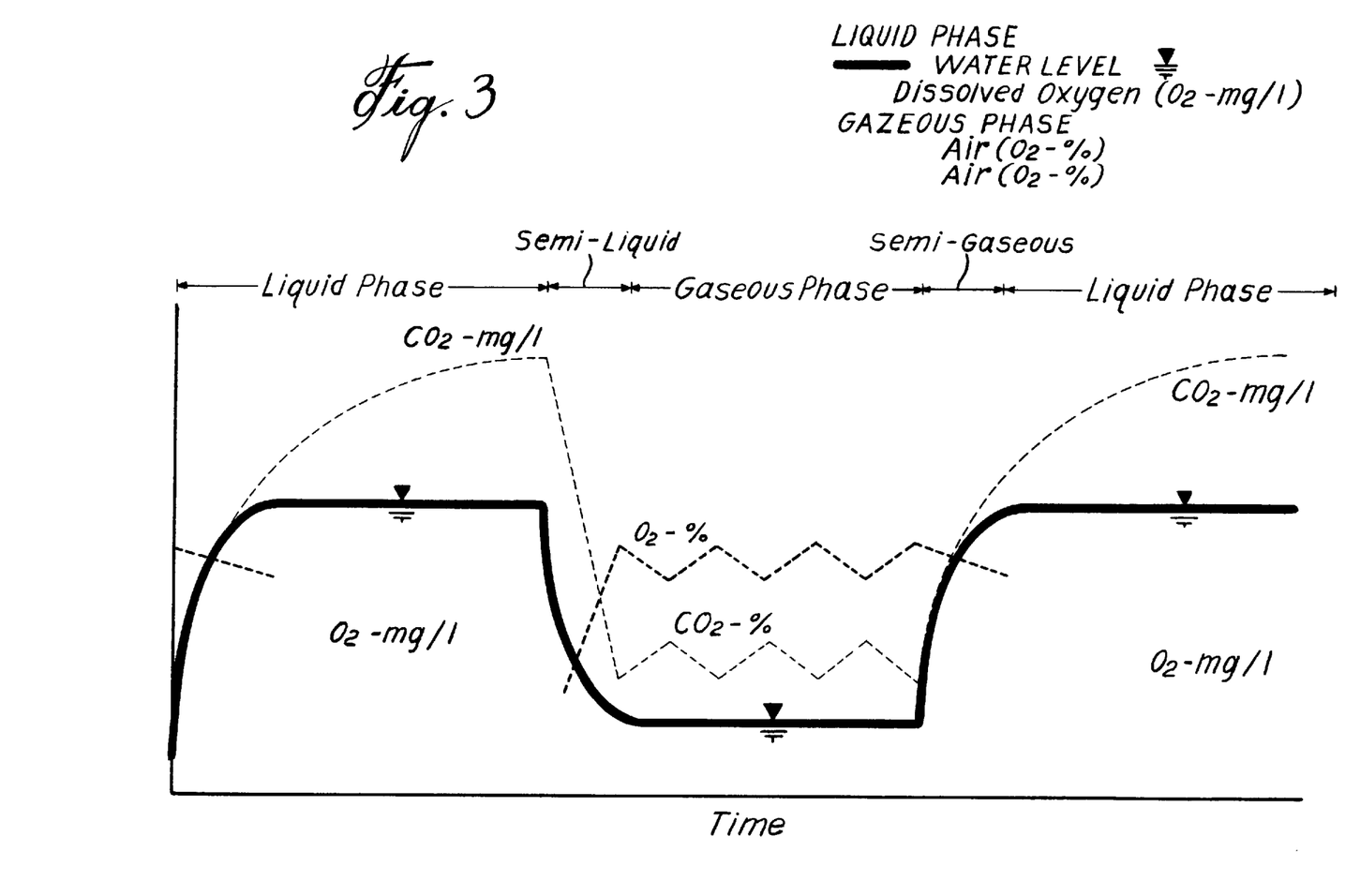
FIG. 3 shows a sequence of liquid and gas modes actuated alternately in one single unit. During the liquid mode, the site is in liquid phase, oxygen is consumed by microorganisms while the $CO_2$ content increases. For example, once oxygen and/or $CO_2$ concentration reaches a determined limiting level at the corresponding sensor, liquids are withdrawn and pumped into the adjustment station or the separation station and/or to an adjacent unit ready to receive liquids.

The alternation of gaseous and liquid modes is particularly illustrated in FIG. 3. When water mode is actuated, the living organisms put to contribution for decontamination consume oxygen and liberate $CO_2$. When the oxygen concentration reaches the lowest predetermined limit, liquids are withdrawn and the gas mode is actuated. The air injected may have a dual purpose: aerating the site for accommodating living organisms needs (particularly plants and bacteria) and carrying volatile contaminants having affinity for gaseous fluids. FIG. 3 shows that oxygen content fluctuates as a result of injection and suction to recover these particular contaminants. When in gas mode, the liquids that have been previously withdrawn goes to the adjustment basin and/or to the adjacent unit that has just terminated the gas mode and is therefore ready to be placed in liquid mode.

Figure 4A:
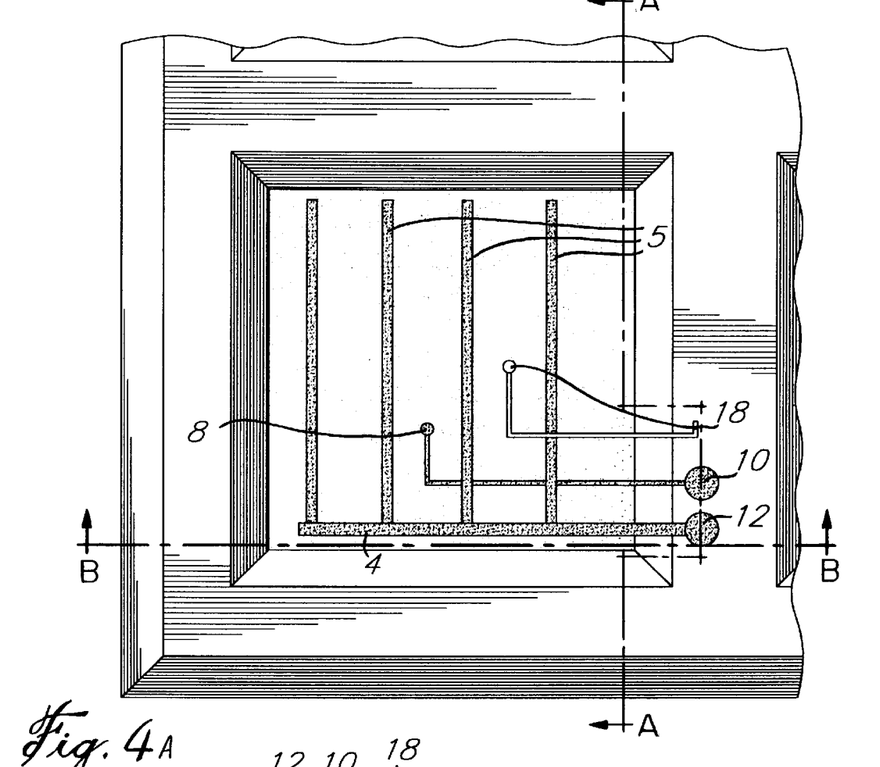
FIG. 4a) is a top view of a confined site in a water mode (liquid phase of FIG. 3). The black circle represents a member of the control chamber that activates injection of water (hydrodynamic means activated (in black) while the aerodynamic sensing means are inactivated (in white).
Figure 4B:
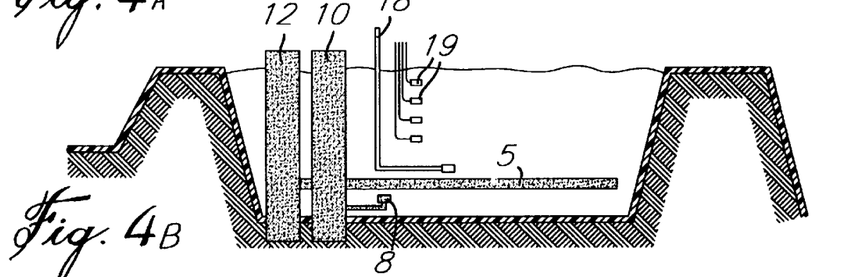
Figure 4C:
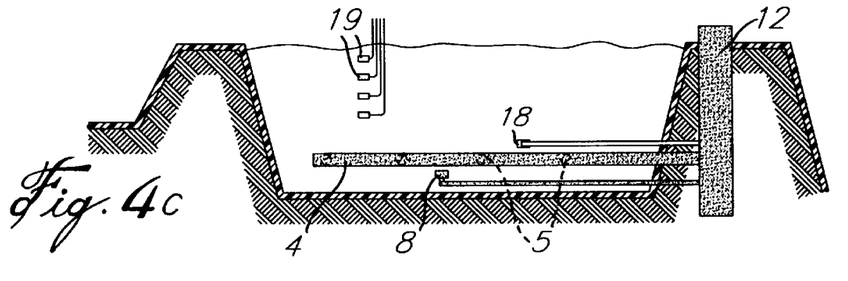

FIGS. 4a), b) and c) properly show a one unit installation when in water mode. Gas sensing means 18 are inactivated (represented in white). Hydrodynamic sensing means 8 are located under the main conduit line 4 because in this particular case, the site will be immersed and only the liquid movement is monitored. Other sensors 19 are shown to monitor diverse parameters. FIG. 4c) particularly show that all sensing means are disposed at midspacing between two adjacent secondary conduit lines.

Figure 5A:
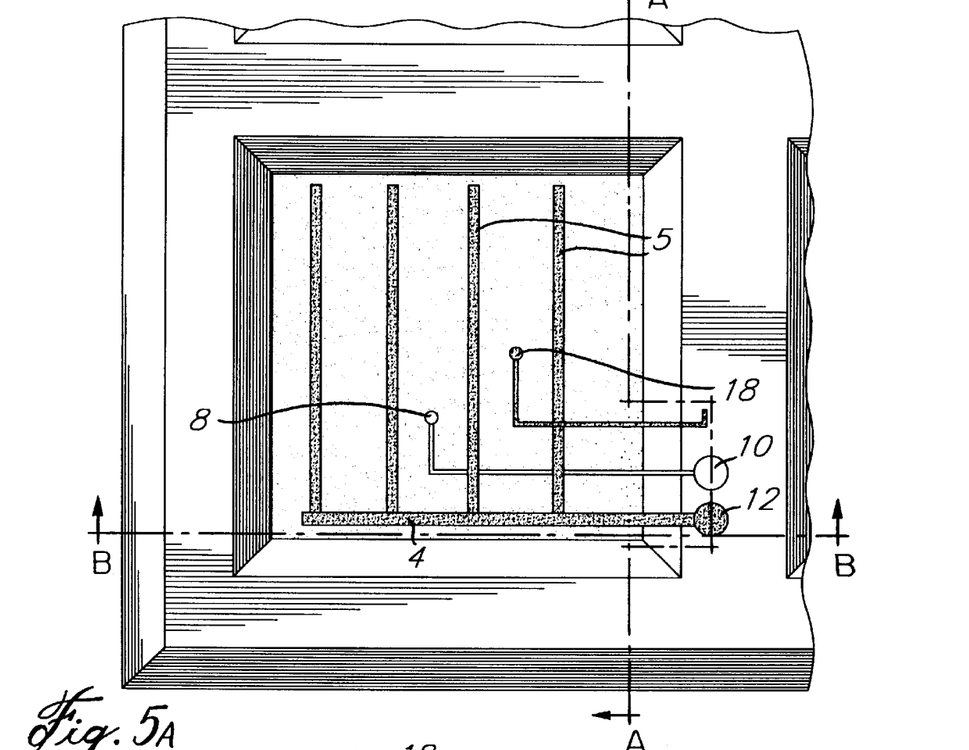
FIG. 5a) is a top view of the confined site of FIG. 4 in air mode (gaseous phase of FIG. 3).

FIGS. 5a), b) and c) show the same unit as represented in FIG. 4 but in air mode. Aerodynamic sensing means 18 are active while the hydrodynamic ones 8 are inactive (shown in white).

The present process might be used to control the acidic production and/or to promote the acidity in view of metal recovering.

EXAMPLE 2

Acid Neutralization

When the first goal is envisaged (acid control), the pH of pumped water will be adjusted with the aid of an alkali. $Ca(OH)_2$ is particularly preferred to sodium bases, for example, because of its environmental innocuity. When this alkaline water is in contact with mine tailings, acid is neutralized, forming a gypsum precipitate, and metallic ions are also precipitated under the form of metal hydroxides. With time, the precipitates should decrease the saturated hydraulic conductivity and the porosity of the deposit, which will contribute to the gradual building of an impervious mass. This phenomenon will be first observable in the most conductive areas, and will extend to the whole deposit. Following the upstream direction of the water into mine tailings, the pH of the deposit and its effluents will increase to reach a value compatible with the environment and plant growth, where the water is in contact with the added arable soil.

When solubilizing, dispersing or surfactant agents are used to desorb ions from the soil, plants are particularly suitable to mobilize these ions. The level of the water table to maintain will be such to permit optimal plant growth. The surface water will be directed to another small basin to be pumped, analyzed and adjusted before being returned to the system.

EXAMPLE 3

Metal Recovery by Acidification

When the second goal is envisaged (metal recovery from mine tailings), a step of acidification should take place before controlling the acidity by alkali addition. Water will be pumped on the surface of the basin and let to percolate down to the draining pipes. The control chamber placed at the exit of the main conduit line will be used to control the level of the water table, and additives (substrates like sulfur, for example) will be added, if necessary, in order to promote growth of acidifying indigenous bacteria. At this step, more performing exogenous bacteria might be added, if acidifying performance is not sufficiently good to solubilize the metals to recover. When the water of the water table will contain sufficient metal concentration, it will be extracted by drainage at the exit of the control chamber to be sent to a recuperation treating plant and then rejected into a secondary bog (storing reservoir) or returned to the system. Once the metals have been recovered by acidification, the pH can be neutralized, and arable soil can be added and sowed for growing plants, while maintaining the quantity of water at a suitable level, as described above.

As stated above, water drained from the water table can be optionally directed to biological reactors. If in situ treatment of a storage reservoir is not feasible for a particular pollutant, the whole system can conceived to introduce an ex situ treatment.

Of course, this method is exemplified to resolve the problem of mine tailings, but it is understood that it could be adapted to contaminated soils in general. It is particularly feasible to decontaminate a soil containing PCPs (polychlorophenols) or creosote, because bacterial agents able to degrade these pollutants already exist. The present invention therefore applies to soils contaminated by hydrocarbons, in general. It may also apply to decontaminate radioactive residues by the use of plants that will hyperaccumulate this type of contaminants and therefore subtract them from the soils and from the draining waters. The limits of this method reside in the availability of agents performing the degradation of a particular type of pollutant as well as the geologic characteristics of the contaminated site and the toxicity of the site towards live forms. It will become obvious to the man skilled in the art that a site which is almost impossible to imperviate will render the efficiency of reaching and maintaining a fluid level more difficult to achieve. The key of this invention is the creation of a real in situ treating zone wherein the soils or residues form an integral part thereof to optimize the conditions of reaction.

Figure 5B:
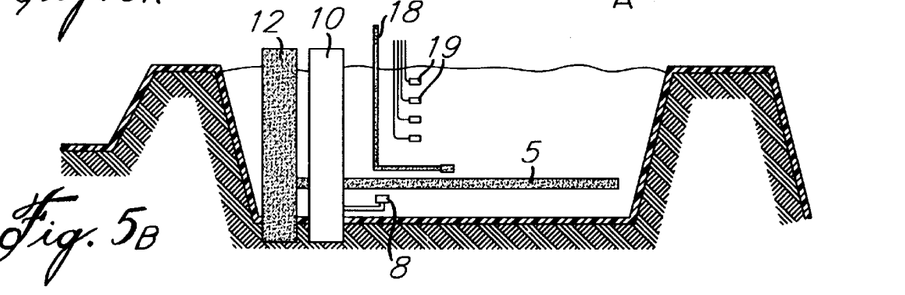
FIG. 5b) is a cross-sectional view taken between lines A—A of FIG. 5a).
Figure 5C:
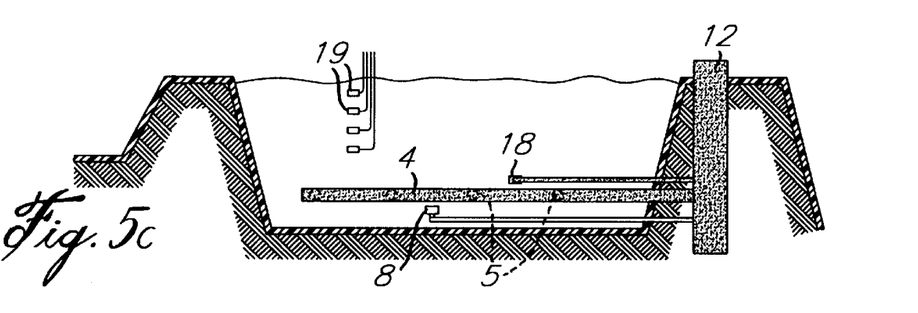

Even though FIGS. 4 and 5 show that liquids and gas can be injected and withdrawn in alternate sequence, it is conceivable that liquids and gas may be injected one behind the other by the same or two circuits of irrigating/draining lines. If necessary, the site can be imperviated on the top and a third circuit may be installed to recover gas and volatile contaminants. Therefore, a liquid-saturated is created and volatile compounds are directed to the top of the site to be recovered by a third circuit of withdrawing conduit lines located at an upper level. Moreover, if a multi-contaminated site contains water soluble, volatile contaminants and LNAPLs, a fourth circuit may be further added in such a way that LNAPLs are recovered just over the circuit of conduit lines that withdraw liquids.

What is claimed is:

1. A system for conducting remediation of a body of contaminated flow-permeable matter, comprising:
   a set of mutually spaced apart flow-producing members for producing a remediation-effective flow in said body;
   a multi-level set of sensors for measuring at least one parameter related to said remediation-effective flow, said sensors each lying in a generally vertical plane situated between two adjacent flow-producing members of said set substantially at equal horizontal distance from said two adjacent flow-producing members; and means for controlling the remediation-effective flow into said body in relation to said at least one measured parameter.

2. A system for conducting remediation of a body of contaminated flow-permeable matter as recited in claim 1, wherein said multi-level set of sensors comprises a generally vertical linear array of sensors.

3. A system for conducting in situ remediation of a body of contaminated fluid-permeable matter, comprising:

a subsurface conduit network comprising a plurality of laterally spaced apart, fluid-permeable conduit lines;

flow producing means connected to the subsurface conduit network for producing a flow of at least one remediation-effective fluid into the body of contaminated fluid-permeable matter;

a subsurface, multi-level set of sensors for measuring at least one fluid-related parameter, said sensors each lying in a generally vertical plane situated between two adjacent fluid-permeable conduit lines substantially at equal horizontal distance from said two adjacent fluid-permeable conduit lines; and means for controlling the flow of said at least one remediation-effective fluid into said body in relation to said at least one measured parameter.

4. A system for conducting in situ remediation of a body of contaminated fluid-permeable matter as recited in claim 3, wherein said subsurface, multi-level set of sensors comprises a generally vertical linear array of sensors.

5. A system for conducting in situ remediation of a body of contaminated fluid-permeable matter as recited in claim 3, wherein said sensors are selected from the group consisting of: aerodynamic sensors, hydrodynamic sensors, piezometric sensors, $CO_2$ metric sensors, $O_2$ metric sensors, pH metric sensors, nutrient metric sensors, photometric sensors, radiometric sensors, thermometric sensors and combinations thereof.

6. A system for conducting in situ remediation of a body of contaminated fluid-permeable matter as recited in claim 3, further comprising means for substantially sealing a bottom and sides of said body of contaminated fluid-permeable matter.

7. A system for conducting in situ remediation of a body of contaminated fluid-permeable matter as recited in claim 3, wherein said flow producing means comprises:

means for injecting said at least one remediation-effective fluid into the body of contaminated fluid-permeable matter through said subsurface conduit network; and means for withdrawing said at least one remediation-effective fluid from the body of contaminated fluid-permeable matter through said subsurface conduit network.

8. A system for conducting in situ remediation of a body of contaminated fluid-permeable matter as recited in claim 3, wherein said at least one remediation-effective fluid is a remediation-effective liquid and wherein said flow producing means comprises:

means for injecting said at least one remediation-effective liquid into the body of contaminated fluid-permeable matter through said subsurface conduit network; and means for withdrawing, through said subsurface conduit network, said at least one remediation-effective liquid from the body of contaminated fluid-permeable matter when said at least one measured parameter indicates that replacement or amendment of said liquid is required.

9. A system for conducting in situ remediation of a body of contaminated fluid-permeable matter as recited in claim 8, wherein said flow producing means further comprises means for maintaining, under the control of said flow controlling means, said at least one remediation-effective liquid into the body of contaminated fluid-permeable matter until said at least one measured parameter indicates that replacement or amendment of said liquid is required.

10. A system for conducting in situ remediation of a body of contaminated fluid-permeable matter as recited in claim 7, wherein said at least one remediation-effective fluid is a gaseous and/or liquid fluid.

11. A system for conducting in situ remediation of a body of contaminated fluid-permeable matter as recited in claim 3, wherein the laterally spaced apart, fluid-permeable conduit lines lie into a generally horizontal plane, and wherein said laterally spaced apart, fluid-permeable conduit lines are generally parallel to each other.

12. A system for conducting in situ remediation of a body of contaminated fluid-permeable matter as recited in claim 3, wherein:

the subsurface conduit network is divided into a first conduit network section and a second conduit network section; and said flow producing means comprises: (a) means for injecting said at least one remediation-effective fluid into the body of contaminated fluid-permeable matter through one of said first and second conduit network sections and means for withdrawing, through the other of said first and second conduit network sections, said at least one remediation-effective fluid from the body of contaminated fluid-permeable matter; (b) means for injecting said at least one remediation-effective fluid into the body of contaminated fluid-permeable matter through both said first and second conduit network sections; and (c) means for withdrawing, through both said first and second conduit network sections, said at least one remediation-effective fluid from the body of contaminated fluid-permeable matter.

13. A system for conducting in situ remediation of a body of contaminated fluid-permeable matter as recited in claim 10, wherein said first and second conduit network sections are both lying in the body of contaminated fluid-permeable matter substantially at the same level.

14. A system for conducting in situ remediation of a body of contaminated fluid-permeable matter as recited in claim 12, wherein said first and second conduit network sections are lying in the body of contaminated fluid-permeable matter at different levels.

15. A system for conducting in situ remediation of a body of contaminated fluid-permeable matter as recited in claim 3, wherein said at least one remediation-effective fluid is a liquid containing at least one decontaminating agent selected from the group consisting of: bacteria, acids, bases, salts, buffers, chelator agents, vitamins, nutrient source substrates, enzymes surfactants, and combinations thereof.

16. A system for conducting in situ remediation of a body of contaminated fluid-permeable matter as recited in claim 3, wherein said body comprises a top layer of soil for growing plants that contribute to remediation of said body.

17. A system for conducting in situ remediation of a body of contaminated fluid-permeable matter as recited in claim 3, further comprising remediation-effective means selected from the group consisting of heating means, vibrating means, electric means, magnetic means and combinations thereof implanted into the body of contaminated fluid-permeable matter to contribute to remediation of said body.

18. A process for conducting remediation of a body of contaminated flow-permeable matter, comprising the steps of:

producing a remediation-effective flow in said body through a set of mutually spaced apart flow-producing members;

measuring at least one parameter related to said remediation-effective flow at a plurality of different sensing levels comprising sensors, with each sensor lying in a generally vertical plane situated between two adjacent flow-producing members of said set substantially at equal horizontal distance from said two adjacent flow-producing members; and controlling the remediation-effective flow into said body in relation to said at least one measured parameter.

19. A process for conducting in situ remediation of a body of contaminated fluid-permeable matter, comprising the steps of:

installing a subsurface conduit network comprising a plurality of laterally spaced apart, fluid-permeable conduit lines;

producing a flow of at least one remediation-effective fluid into the body of contaminated fluid-permeable matter through the subsurface conduit network;

measuring at least one fluid-related parameter at a plurality of different sensing levels comprising sensors, with each sensor lying in a generally vertical plane situated between two adjacent fluid-permeable conduit lines substantially at equal horizontal distance from said two adjacent fluid-permeable conduit lines; and controlling the flow of said at least one remediation-effective fluid into said body in relation to said at least one measured parameter.

20. A process for conducting in situ remediation of a body of contaminated fluid-permeable matter as recited in claim 19, wherein said flow producing step comprises the steps of:

injecting said at least one remediation-effective fluid into the body of contaminated fluid-permeable matter through said subsurface conduit network; and withdrawing said at least one remediation-effective fluid from the body of contaminated fluid-permeable matter through said subsurface conduit network.

21. A process for conducting in situ remediation of a body of contaminated fluid-permeable matter as recited in claim 19, wherein said remediation-effective fluid is a remediation-effective liquid and wherein said flow producing step comprises the steps of:

injecting said at least one remediation-effective liquid into the body of contaminated fluid-permeable matter through said subsurface conduit network; and withdrawing, through said subsurface conduit network, said at least one remediation-effective liquid from the body of contaminated fluid-permeable matter when said at least one measured parameter indicates that replacement or amendment of said liquid is required.

22. A process for conducting in situ remediation of a body of contaminated fluid-permeable matter as recited in claim 21, wherein said flow producing step further comprises the step of maintaining, under the control of said flow controlling step, said at least one remediation-effective liquid into the body of contaminated fluid-permeable matter until said at least one measured parameter indicates that replacement or amendment of said liquid is required.

23. A process for conducting in situ remediation of a body of contaminated fluid-permeable matter as recited in claim 19, wherein said remediation-effective fluid is a gaseous and/or liquid fluid.

24. A process for conducting in situ remediation of a body of contaminated fluid-permeable matter as recited in claim 19, wherein:

the subsurface conduit network is divided into a first conduit network section and a second conduit network section; and said flow producing step comprises at least one of the following steps: (a) a step of injecting said at least one remediation-effective fluid into the body of contaminated fluid-permeable matter through one of said first and second conduit network sections and a step of withdrawing, through the other of said first and second conduit network sections, said at least one remediation-effective fluid from the body of contaminated fluid-permeable matter; (b) a step of injecting said at least one remediation-effective fluid into the body of contaminated fluid-permeable matter through both said first and second conduit network sections; and (c) a step of withdrawing, through both said first and second conduit network sections, said at least one remediation-effective fluid from the body of contaminated fluid-permeable matter.

25. A process for conducting in situ remediation of a body of contaminated fluid-permeable matter as recited in claim 19, wherein said flow producing step comprises a step of producing a flow of remediation-effective liquid and a step of producing a flow of remediation-effective gaseous fluid.

26. A process for conducting in situ remediation of a body of contaminated fluid-permeable matter as recited in claim 19, wherein said flow producing step comprises the step of producing alternately a flow of remediation-effective liquid and a flow of remediation-effective gaseous fluid.

27. A process for conducting in situ remediation of a body of contaminated fluid-permeable matter as recited in claim 19, wherein said remediation-effective fluid is a liquid, said process further comprising the step of adding in said liquid at least one decontaminating agent selected from the group consisting of: bacteria, acids, bases, salts, buffers, chelator agents, vitamins, nutrient source substrates, enzymes surfactants, and combinations thereof.

28. A process for conducting in situ remediation of a body of contaminated fluid-permeable matter as recited in claim 19, further comprising the step of growing, on a top layer of soil of said body, plants that contribute to remediation of said body.

29. A process for conducting in situ remediation of a body of contaminated fluid-permeable matter as recited in claim 19, further comprising the step of sealing a bottom and sides of said body of contaminated fluid-permeable matter.

* * * * *